M. T. & M. C. CHAPMAN.
DEEP WELL PUMP.
APPLICATION FILED MAR. 10, 1909.

1,149,633.

Patented Aug. 10, 1915.

Witnesses:

Inventors.
Matthew T. Chapman.
Mark C. Chapman,
by Bond Adams Pickard Jackson
their Attys.

M. T. & M. C. CHAPMAN.
DEEP WELL PUMP.
APPLICATION FILED MAR. 10, 1909.

1,149,633.

Patented Aug. 10, 1915.
8 SHEETS—SHEET 4.

M. T. & M. C. CHAPMAN.
DEEP WELL PUMP.
APPLICATION FILED MAR. 10, 1909.

1,149,633.

Patented Aug. 10, 1915.
8 SHEETS—SHEET 5.

M. T. & M. C. CHAPMAN.
DEEP WELL PUMP.
APPLICATION FILED MAR. 10, 1909.

1,149,633.

Patented Aug. 10, 1915.
8 SHEETS—SHEET 7.

Witnesses:

Inventors.
Matthew J. Chapman,
Mark C. Chapman,

M. T. & M. C. CHAPMAN.
DEEP WELL PUMP.
APPLICATION FILED MAR. 10, 1909.

1,149,633.

Patented Aug. 10, 1915.
8 SHEETS—SHEET 8.

Witnesses:

Inventors,
Matthew T. Chapman,
Mark C. Chapman,

UNITED STATES PATENT OFFICE.

MATTHEW T. CHAPMAN AND MARK C. CHAPMAN, OF AURORA, ILLINOIS, ASSIGNORS TO THE AMERICAN WELL WORKS, OF AURORA, ILLINOIS, A CORPORATION OF ILLINOIS.

DEEP-WELL PUMP.

1,149,633.  Specification of Letters Patent.  Patented Aug. 10, 1915.

Application filed March 10, 1909. Serial No. 482,517.

*To all whom it may concern:*

Be it known that we, MATTHEW T. CHAPMAN and MARK C. CHAPMAN, citizens of the United States, residing at Aurora, in the county of Kane and State of Illinois, have invented certain new and useful Improvements in Deep-Well Pumps, of which the following is a specification, reference being had to the accompanying drawings.

Our invention relates to pumps for raising water from deep wells, and has to do more particularly with pumps of the centrifugal type.

The object of our invention is to provide a new and improved pump by which a larger amount of water may be pumped in a given time or by a given expenditure of power. To this end, it consists in the improvements hereinafter described and pointed out in the claims.

In the accompanying drawings.

Our improved pumping mechanism is in the nature of a centrifugal turbine pump, since one or more runners or impellers in the nature of turbine wheels are employed in connection with fixed inclined blades to force the water up, the runner blades acting by their rotation to throw the water outward against the stationary inclined blades and thereby compel it to rise through the pump cylinder. Suitable provision is made to counteract the downward pressure on the runners so that such pressure is neutralized soon after the pump is put in service. The several runners are mounted on a common shaft vertically disposed in a suitable cylinder, its lower end being mounted in a bearing which centers and guides it. Intermediate guides and bearings are also provided, and at the lower end of the shaft there is a water piston which is fitted in a suitable cylinder, to which water is admitted under pressure equal to that of the column of water upon the runners, the water below said water piston acting in an upward direction so as to substantially neutralize the downward pressure of the water in the pump cylinder, thus causing the shaft to rotate freely. The shaft is rotated by power applied to it near its upper end, either by a belt or by a direct-connected motor and is vertically adjustable to compensate for wear, as hereinafter described. The upper portion of the pump shaft is inclosed by a sleeve or tube so that the water in the well does not reach it, the water being discharged through a suitable outlet which connects with the upper end of the pump cylinder.

Figures 1, 2, 3, 4:
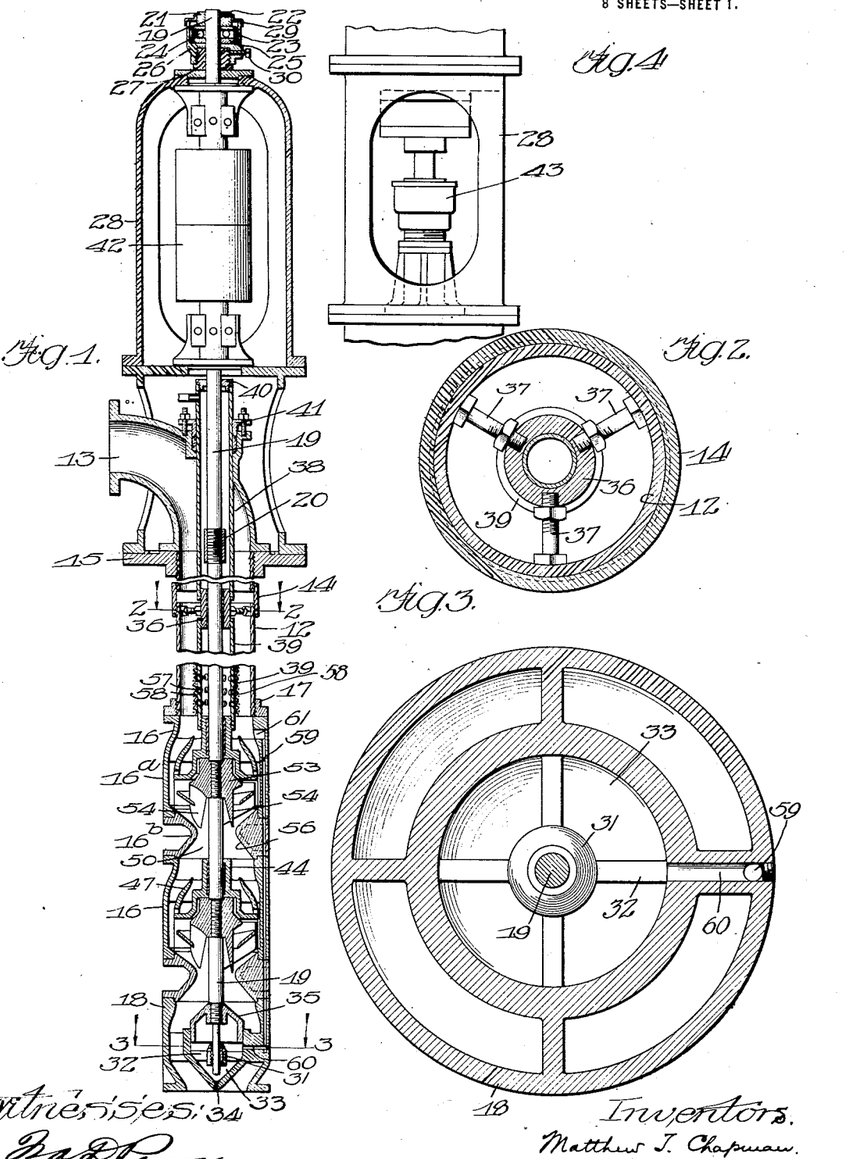
—Figure 1 is a sectional view, illustrating our improved pump.
Fig. 2 is a cross-section, on line 2—2 of Fig. 1, illustrating the means for centering and supporting the shaft bearings.
Fig. 3 is a section on line 3—3 of Fig. 1, illustrating the construction of the lower end portion of the pumping mechanism.
Fig. 4 is a view, showing a motor for driving the operating pump.
Figure 12:
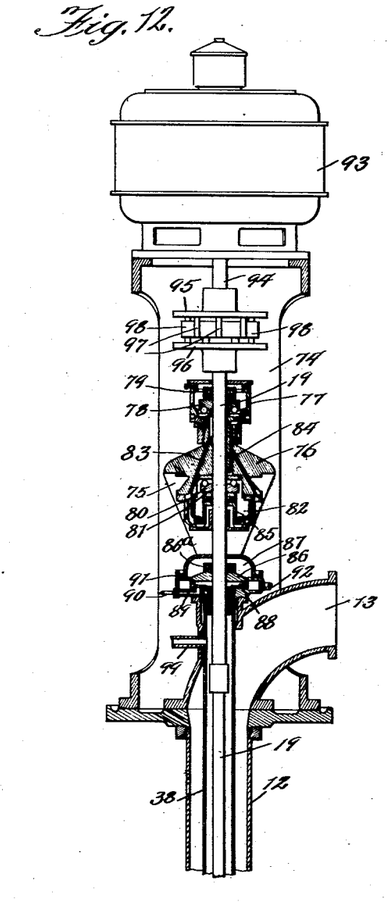
Fig. 12 is a partial sectional view showing the upper portion of the pump.

Referring to the drawings for a description of the particular embodiments of our invention therein illustrated,—12 indicates a tube, which, for convenience, will be termed the well-tube as it extends down into the well and forms a conduit for conducting the water raised up to the surface where it is discharged through an elbow or other outlet 13 which, as shown in Figs. 1 and 12, connects with the upper end of the well-tube 12. It will be understood that the well-tube is made up of any desired number of sections which may be united by plain couplings 14 shown in Fig. 1, but are best united by our improved couplings hereinafter described.

Referring now more particularly to the construction shown in Figs. 1 to 11, 15 indicates a base-plate which supports the portions of the mechanism which are above ground, as shown in Fig. 1.

16 indicates several tubular sections, which will be termed "pump cylinders", since the pumping mechanism operates in them. Any suitable number of pump cylinders may be employed, depending on the depth of the well, the volume of water to be pumped, or the quantity of water to be pumped in a given time. Said sections are alike and are fitted together so that the several units when united serve to make up a sectional pump cylinder. The several sections may be secured together in any suitable way, as by bolts. They are adapted to be lowered into the well, the uppermost cylinder 16 being secured to the end of the well-tube preferably by means of a screw collar 17 which screws upon the lower end of the well-tube 12.

18 indicates a bottom section or cylinder, which is secured to the lowermost cylinder 16 and is provided with a bearing for the lower end of the shaft, as will be hereinafter described.

19 indicates the pump shaft, which is a vertically-disposed shaft mounted centrally in the well-tube and extending from above the ground down to the bottom section 18. Said shaft is preferably solid, but may be tubular, if desired, and is composed of sections united by couplings 20, as shown in Fig. 1. At its upper end it is provided with a nut 21 preferably secured thereto by a set-screw 22, as shown in Fig. 1, said nut bearing on a top bearing-plate 25 which rests on bearing-balls 24 which in turn rest on a plate 25 carried by an adjusting-plate 26. Said adjusting-plate 26 screws upon a head 27, which in turn is carried by a framework 28 resting on the base-plate 15. Thus it will be seen that the shaft 19 is suspended upon the balls 24 by means of the nut 21. The latter is preferably provided with a cap 29 which incloses and protects the ball bearings resting on the upper edge of the adjusting-plate 26. By screwing the adjusting-plate 26 up or down, obviously the shaft 19 may be raised or lowerd to compensate for wear, as hereinafter described. In order to lock the adjusting-plate 26 in its different positions, a set-screw 30 is provided, as shown in Fig. 1, but any other suitable means for the purpose may be employed.

The lower end of the shaft 19 is mounted in a bearing sleeve 31 carried by radial arms 32 supported by the bottom section 18, as best shown in Figs. 1 and 3, said arms being in the lower portion of a cylinder 33, which is provided in said section 18, as shown. The lower portion of said cylinder is tapered downwardly and inwardly toward the center where an opening 34 is provided to permit sand and other similar particles to escape. The upper portion of said cylinder receives a piston 35 which fits it closely and moves vertically therein, said piston being secured upon the lower end of the shaft 19. The function of the piston 35 will be hereinafter set forth.

36 indicates an intermediate bearing for the shaft 19, one or more of which may be provided, said bearing consisting of a babbited sleeve which is supported by radial bolts 37, the outer ends of which are connected with the well-tube, as shown in Figs. 1 and 2. Said bearing, therefore, centers the shaft 19 in addition to supporting it against lateral strain.

38—39 indicate tubes, which connect with the upper and lower ends, respectively, of the bearing sleeve 36, the tube 38 extending up through the elbow 13 and being provided with a suitable cap 40. The latter tube serves to keep the dirty water from grinding or cutting the joints or bearings of the shaft 19. A stuffing-box 41 prevents the escape of water where said tube passes through said elbow. The lower end of the tube 39 extends down to the upper end of the cylinder 16, where it is connected with part of the water-elevating mechanism, as hereinafter described. In the drawings we have shown two sleeves 38—39, but a greater number may be employed, if desired, depending on the depth of the well,—it being understood that the shaft 19 is inclosed by said tubes which separate the upper portion thereof from the water in the well-tube 12.

The shaft 19 may be rotated by any suitable mechanism, as, for example, by means of power applied through pulleys 42, as shown in Fig. 1, or by a motor 43 mounted directly upon the upper end thereof, as shown in Fig. 4.

Figure 5:
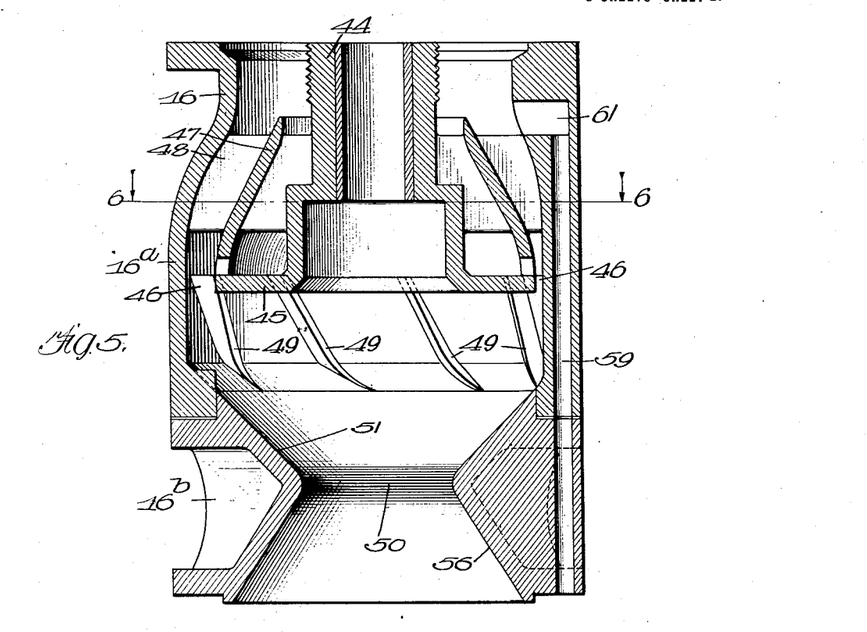
Fig. 5 is an enlarged detail, being a vertical section on line 5—5 of Fig. 6, illustrating the stationary portion of the water-elevating mechanism.
Figure 6:
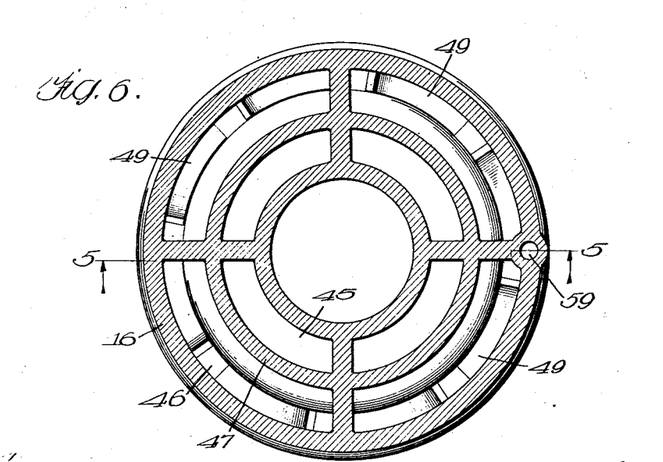
Fig. 6 is a cross-section on line 6—6 of Fig. 5.

The interior construction of the cylinders 16 is best shown in Figs. 5 and 6, from which it will be seen that each cylinder is really in two parts, the upper part 16$^a$ having a central sleeve 44 suitably babbited and forming a bearing for the pump shaft 19. Said sleeve is provided at its lower end with an outwardly-extending radial flange 45 which terminates a short distance from the inner face of the cylinder section, leaving a narrow annular space 46, shown in Figs. 5 and 6. Around the outer margin of the flange 45 there is provided a tapered sleeve 47, the smaller diameter of which is at the top, said sleeve being substantially parallel with the inner face of the cylinder section so that an upwardly and inwardly inclined annular channel 48 is provided for the passage of water. In the annular passage 46 between the margin of the flange 45 and the inner surface of the cylinder section are a series of inclined blades 49 which are fixed to the inner face of the cylinder section and are arranged at short intervals, forming inclined passages through which the water rises to the passage 48 when forced violently outward against said blades 49, as hereinafter described.

16$^b$ indicates the lower member of the cylinder 16, which is fitted thereto, as shown in Fig. 5, and is shaped to provide a vertical passage which is in the shape of an hour-glass, the intermediate portion thereof being contracted, as shown at 50 in Fig. 5, the upper half of said section forming an inclined bottom 51 for the chamber which contains the blades 49. This tapered bottom coöperates with the turbine wheels, as will hereinafter appear. All the parts of the cylinder 16 are fixed or rigid.

52 indicates the pump runners or impellers, which act to throw the water outward against the inclined blades 49 which direct it upward through the pump cylinders and well-tube. Said runners, of which any number may be used, are placed in the cylinders 16, as shown in Fig. 1, being mounted upon and secured to the pump shaft 19 so as to rotate therewith. This is best secured by making the pump shaft in sections, the ends of adjoining sections being screwed into the hub 53 of the runner 52, as shown in Fig. 1, so that the hub serves as a coupling to unite the sections of the shaft and at the same time the runner is prevented from moving longitudinally upon the shaft.

Figures 7, 8, 9:
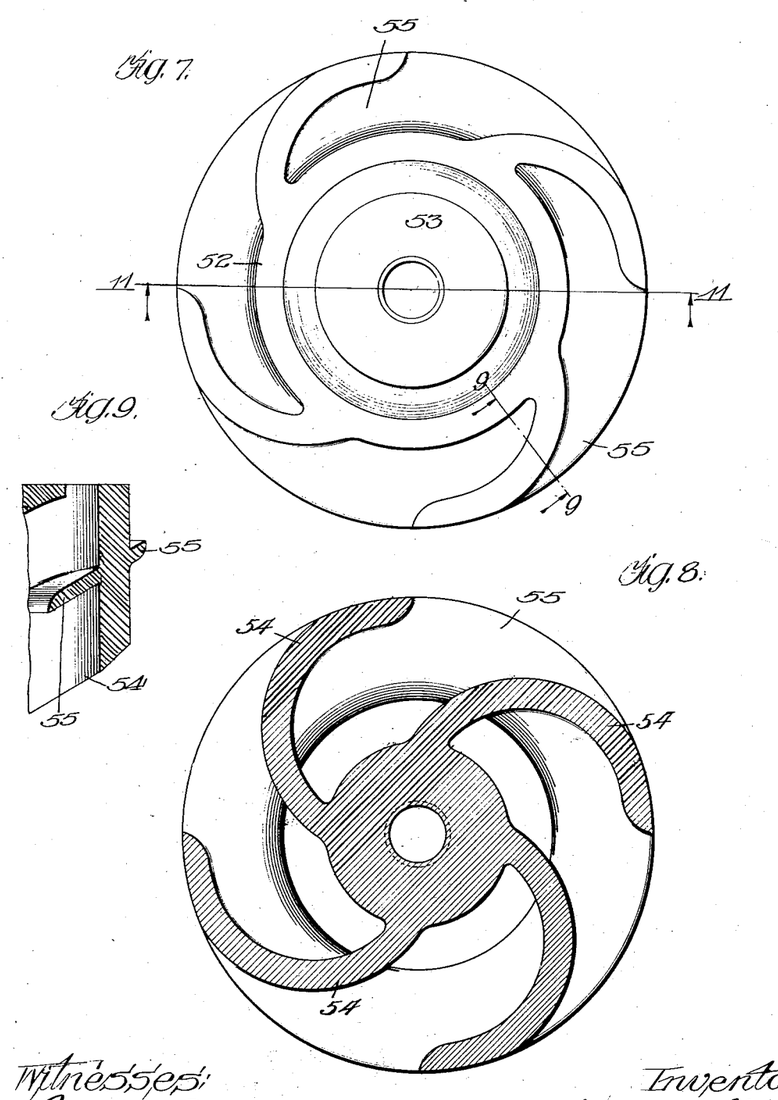
Fig. 7 is a plan view of the rotary portion of the water-elevating mechanism.
Fig. 8 is a horizontal section on line 8—8 of Fig. 11.
Fig. 9 is a detail, being a partial section on line 9—9 of Fig. 7.
Figure 10:
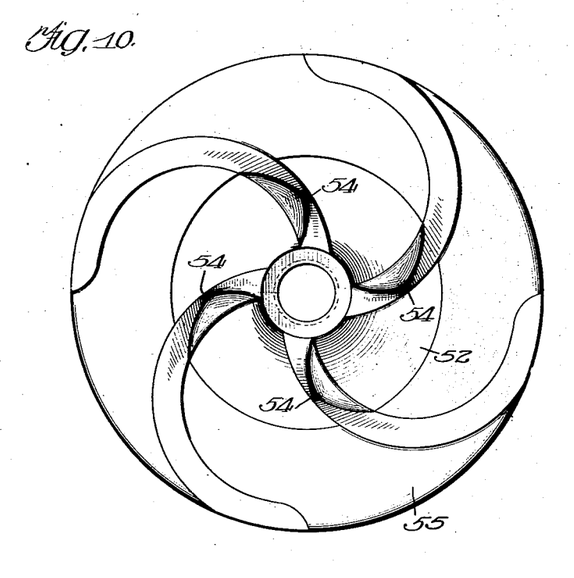
Fig. 10 is an inverted plan view of the part shown in Fig. 7.
Figure 11:
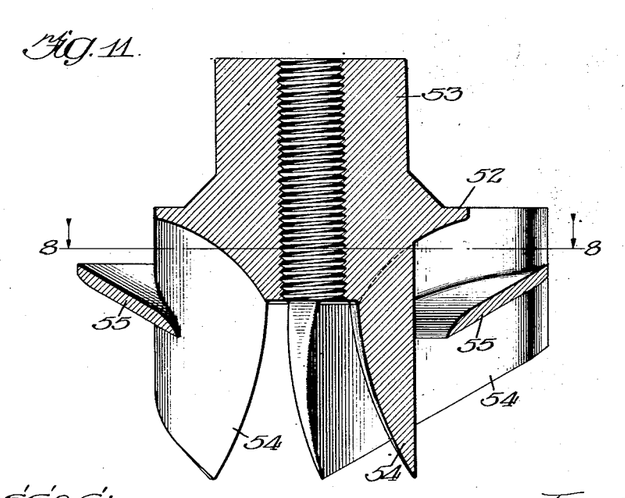
Fig. 11 is a vertical section on line 11—11 of Fig. 7.

Each of the runners, in the construction shown in Figs. 1 and 7 to 11, comprises the hub 53 and a series of downwardly-extending spiral blades 54 similar in some respects to the blades of a propeller, said blades being connected intermediately by an annular flange 55 which extends around the wheel a short distance from the upper ends of the blades 54, as shown in Fig. 11, being intersected by said blades, as illustrated in Fig. 9. As best shown in Figs. 1 and 11, the lower edges of the blades 54 are inclined to conform to the inclination of the upper inner face of the member 16$^b$ which serves to confine the water and facilitate the action of the blades 54 upon it; also to direct the water upward against the stationary blades 49 as it is forced outward and upward by the rotation of the runner. The tapered lower face of the member 16$^b$, as best shown at 56 in Figs. 1 and 5, directs the upwardly-flowing water toward the runner above it.

The water-elevating mechanism is lowered into the well until the lowermost runner at least is submerged when, by rotating the shaft 19, the runners act to force the water in which they are immersed outward and upward against the stationary blades 49, which, in turn, direct it upward to the space above the runner where it is subjected to the action of the next higher runner, if more than one is used. After passing the uppermost runner the water continues to rise until it is discharged through the outlet 13. For the purpose of lubricating the shaft bearings the lower end portion of the tube 39 is perforated, as shown at 57 in Fig. 1, the perforations being protected by a screen 58, or other suitable filtering medium, to prevent sand or other particles from entering the tube. When the pump is in operation, water from the discharge passage enters tube 39 through the screen and lubricates the shaft bearings above the perforations as well as below them, since the pressure in said tube is the same as that in the well-tube 12. When the pump is not in operation, the water settles back and flows out through the perforations in the tube 39 and through the screen 58, thereby cleansing the screen of any matter accumulated on it. Inasmuch as the perforations 57 and the screen 58 are practically at the lower end of the tube 39, when the pump is stopped all the water in said tube passes out.

As will be readily understood by those acquainted with the action of centrifugal pumps, water rising from the rotary water raising elements into the lower end of the well tube 12 has a rapid swirling or rotating movement, by reason of which the sand and sediment carried up by the water is forced by centrifugal force toward the outside away from the screen 58, whereby the purifying effect of the said screen is greatly enhanced.

In order to counteract the downward pressure upon the pump, we provided for admitting water to the cylinder 33 below the piston 35 by providing a conduit 59 in each of the pump cylinders, best shown in Figs. 1 and 5, said conduit being formed by registering passages in each of the several cylinder sections. The lowermost section 18 is also provided with a passage 60 which communicates with said conduit and with the cylinder 33 so that water is admitted through said conduit to said cylinder. The upper end of the conduit 59 opens into the upper portion of the uppermost cylinder 16 above the runner therein, as shown at 61 in Figs. 1 and 5, so that the pressure of the water in the well-tube 12 is communicated from below to the piston 39, thus creating a balance and relieving the shaft 19 with the pumping mechanism supported thereby from downward pressure. By making the bottom of the cylinder 33 conical and providing the outlet 34 particles of sand or other matter carried by the water through the conduit 59 gravitate to the bottom of the cylinder and may escape through such opening, thereby avoiding danger of grinding which might occur in case of sand getting in between the cylinder 33 and piston 35. The cylinder 33 and piston 35 also inclose and protect the lower bearing 31.

From the foregoing description it will be seen that our improved pumping mechanism may be advantageously employed to elevate water which cannot be lifted by a suction pump placed at the surface, it being capable of efficient operation for elevating water from depths of hundreds of feet below the surface. By providing two anti-friction bearings, such as the ball bearing at the top from which the shaft is suspended and the water-step at the bottom, we provide not only for properly supporting the drive shaft at the commencement of the operation of the pump, but also during its operation. When the pump is first started, there being little water in the well, the weight of the shaft and parts carried thereby is supported from the ball bearing at the top, but as soon as the water being pumped reaches the uppermost cylinder a portion of it passes through conduit 59 to the cylinder 33 and begins to relieve the shaft of downward pressure, the upward pressure thus caused increasing with the height of the water in the well until the downward pressure is neutralized, as above stated. In operation of pumps of this character there is considerable wear between the runners and the co-acting stationary portions of the cylinders in which they are mounted, and to maintain the efficiency of the pump, it is necessary to compensate for this wear. In our improved pumping apparatus this is accomplished by means of the adjusting plate or nut 26 which screws upon the head 27. By adjusting this nut, the pump-shaft 19 may be adjusted vertically so as to maintain the runners in the most effective relation to the cylinders in which they operate. The bearing 31 at the lower end of the pump-shaft permits of this adjustment and also prolongs the life of the pump by properly holding the lower end of the pump-shaft in position, and thereby preventing lateral displacement of the pump runners while in operation.

Figure 13:
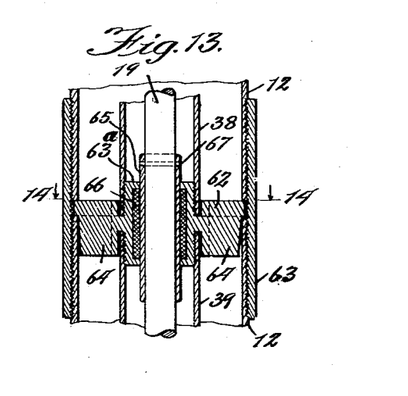
Fig. 13 is a vertical section showing a modified construction of the coupling devices.
Figure 14:
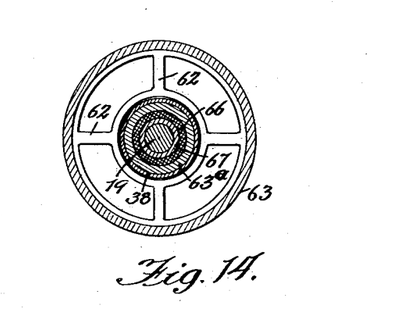
Fig. 14 is a horizontal section on line 14—14 of Fig. 13.
Figure 15:
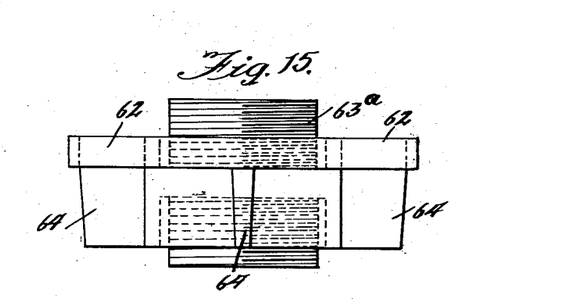
Fig. 15 is an enlarged side view of the spider shown in Figs. 13 and 14.
Figure 16:
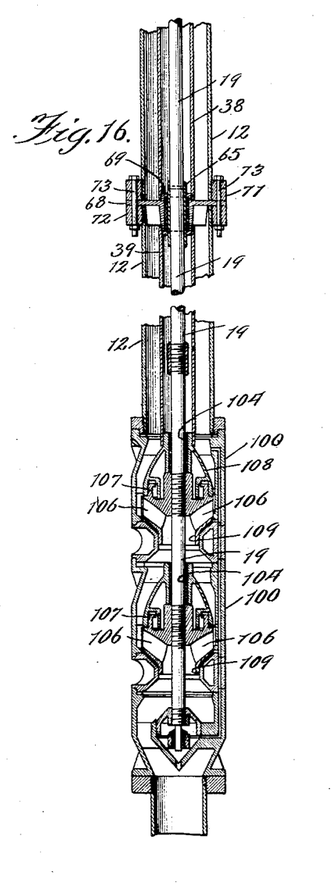
Fig. 16 is a vertical section showing a modification.

In Figs. 13, 14 and 15 we have illustrated one of our improved coupling devices for uniting the several sections of the well-tube or tubes and of the protecting tube or tubes and the devices for centering the pump shaft and the bearings therefor. As best shown in Figs. 13 and 14, 62 indicates a spider, the outer margin of which fits between the adjacent ends of adjoining sections of the well-tube 12, and is firmly clamped between them by a coupling sleeve 63 which draws the sections of the well-tube together, as shown in Fig. 13. The spider 62 is provided with a central sleeve 63$^a$, the upper and lower ends of which are externally screw-threaded to receive the adjacent ends of the tubes 38—39. Thus the sleeve 63$^a$ serves to center the tubes 38—39 and hold them properly in position. This is further secured by providing the spider 62 with depending webs 64, as shown in Figs. 13 and 15. The sleeve 63$^a$ forms a bearing for the pump-shaft 19, which passes through it and is provided with a sleeve 65 which bears in the sleeve 63$^a$, the latter being provided with a lining 66 of Babbitt metal or other suitable anti-friction material. The sleeve 65 is fixedly secured to the pump-shaft 19 by a rivet 67, or other suitable means, as shown in Fig. 13. Thus the wear is taken by the sleeve 65 instead of by the shaft, and the several parts are properly centered and held in position so that they cannot get out of alinement.

Figure 17:
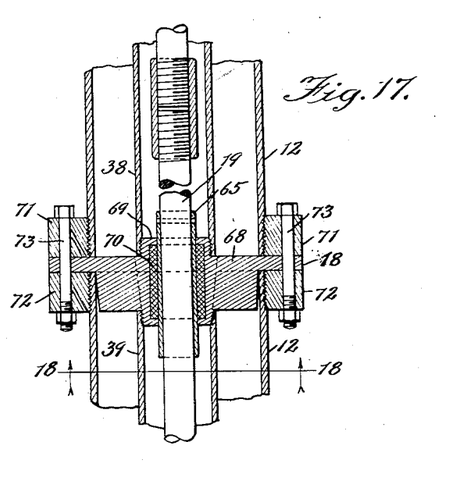
Fig. 17 is an enlarged vertical section showing still another construction of the coupling devices.
Figure 18:
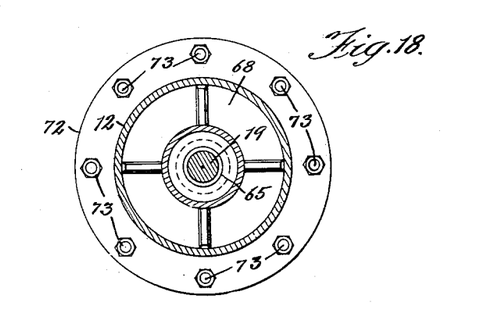
Fig. 18 is a cross-section on line 18—18 of Fig. 17.
Figure 19:
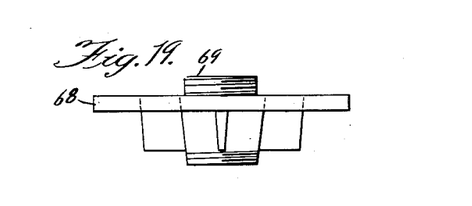
Fig. 19 is a side view of the form of spider shown in Figs. 17 and 18.

In Figs. 17, 18 and 19 we have shown a modified construction for the same purpose. In the construction therein shown we employ a spider 68 similar in many respects to the spider 62 since it has a central sleeve 69, which is screw-threaded and serves to unite the tubes 38—39 in the manner already described. It also is provided with a babbitted bearing 70, in which the pump-shaft 19 bears, and the latter is provided with the sleeve 65 in the same way as shown in Fig. 13. The spider 68, however, is of greater diameter than the well-tube 12 so that its margin projects beyond the outer surface of the well-tube and is engaged by coupling-rings 71—72 which are screwed, respectively, upon the lower end of the upper section and the upper end of the lower section of the well-tube, as shown in Fig. 17, and thus bear against the opposite faces of the projecting portion of the spider 18. The two rings 71—72 and the spider are all connected together by bolts 73 which pass through them, as shown in Fig. 17, thus firmly securing together the sections of the well-tube.

In Fig. 12 we have shown a modified arrangement of the driving mechanism for operating the pump and the mechanism for supporting and controlling the position of the pump-shaft. In the construction therein shown, 74 indicates a standard having laterally-projecting lugs 75, on which rests a casting 76 which carries certain devices for supporting and lubricating the pump-shaft 19. At the top of said casting 76 is provided a box 77 in which is placed a ball-bearing 78. Above said ball-bearing is a plate or disk 79 which is secured to the upper end of the shaft 19 so that it assists in supporting the weight of the shaft and transmits the same to the ball-bearing 78.

80 indicates a similar ball-bearing in the lower portion of the casting 76 which rests upon a sleeve or plate 81 which is also secured to the shaft 19 and transmits to the ball-bearing 80 the upward thrust of said shaft.

82 indicates an oil-chamber in the lower portion of the casting 76 and communicating by a duct 83 with the interior of the bearing-box 77.

84 indicates a return duct leading from the box 77 to the chamber 82.

85 indicates a wheel or disk secured to the plate 81 in the chamber 82 so that it rotates with the shaft 19 and serves by its rotation to force oil from the chamber 82 up through the duct 83 to the bearing-box 77 thereby lubricating the bearing 78 therein. The oil thus forced up to the box 77 returns through the duct 84 to the chamber 82 and thus is caused to circulate continuously as the pump-shaft 19 rotates. By this arrangement both ball bearings are constantly kept lubricated.

To further assist in supporting the pump-shaft and to regulate the point at which it works, we provide a water-governor comprising a piston 86 which is secured to the shaft 19 in any suitable way, as by set-screws 86$^a$ within a chamber 87 located a short distance above the outlet-pipe 13. Said piston 86 overlies a water-chamber 88 with which communicates a passage 89 supplied through a pipe 90 with water under pressure. The arrangement is such that water admitted through the pipe 90 presses upward on the piston 86. Should the pressure of the water admitted increase above the normal the pressure on the piston 86 will raise the pump-shaft, thereby carrying said piston out of contact with the walls of the chamber 88 and permitting the water to escape into the chamber 87 through passages 91 and thence escape through an escape-pipe 92, which communicates with said chamber 87, as shown in Fig. 12. By this construction the pump-shaft rotates on a film of water, which further relieves it from friction and improves its operation.

93 indicates a motor for driving the shaft 19, said motor being mounted on top of the standard 74 and being connected with the shaft 19 by a flexible connection which insures the proper operation of the shaft even though it should get somewhat out of alinement with the motor.

As shown in Fig. 12, 94 indicates the motor-shaft which carries at its lower end a coupling-member 95 which engages a corresponding coupling-member 96 carried at the upper end of the pump-shaft 19. The coupling-member 95 carries a series of downwardly-projecting pins 97 which engage teeth 98 carried by the coupling-member 96, so that the coupling-members interlock and insure the driving of the pump-shaft by the motor.

99 indicates a pipe which communicates with the tube 38 and is used to admit water to the tube 38 to wet the shaft bearings and lubricate them before starting the pump.

Figure 20:
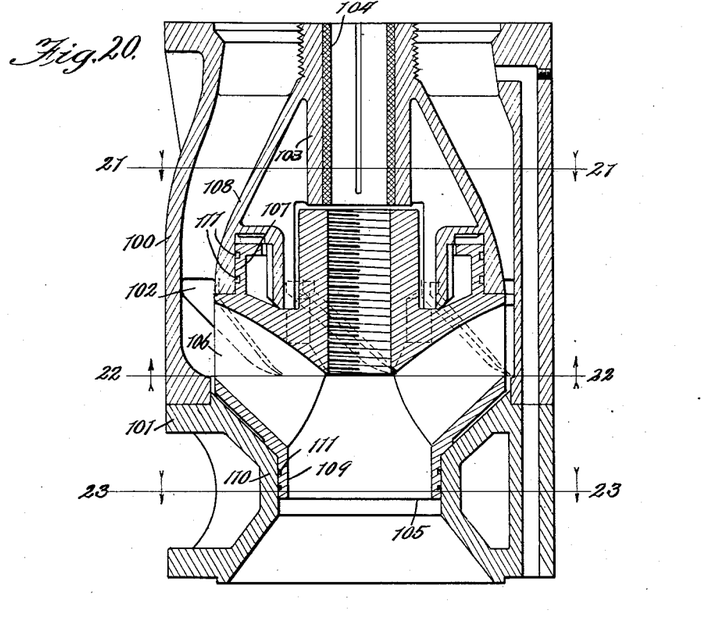
Fig. 20 is an enlarged sectional view of a modified form of pump-cylinder and impeller.
Figure 21:
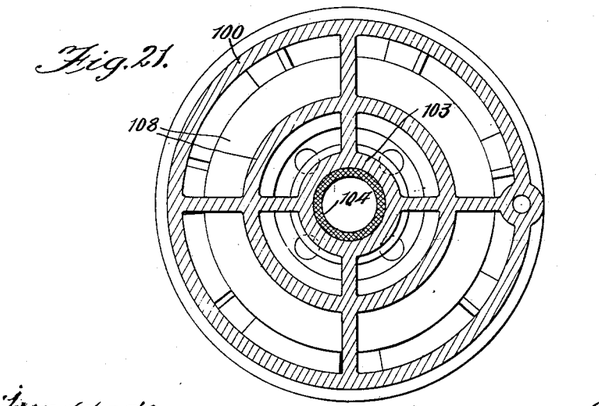
Fig. 21 is a cross-section on line 21—21 of Fig. 20.
Figure 22:
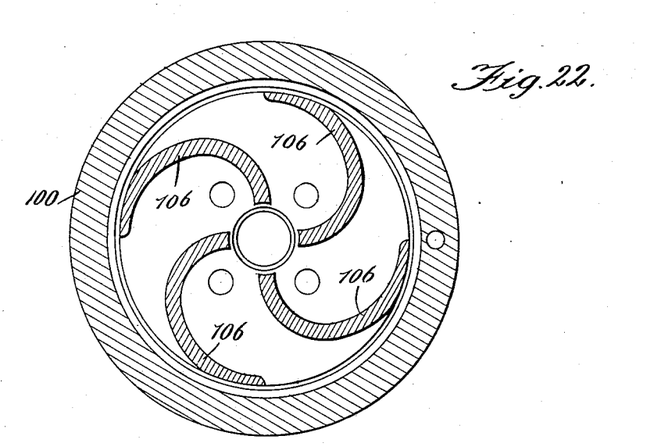
Fig. 22 is a cross-section on line 22—22 of Fig. 20, looking up.
Figure 23:
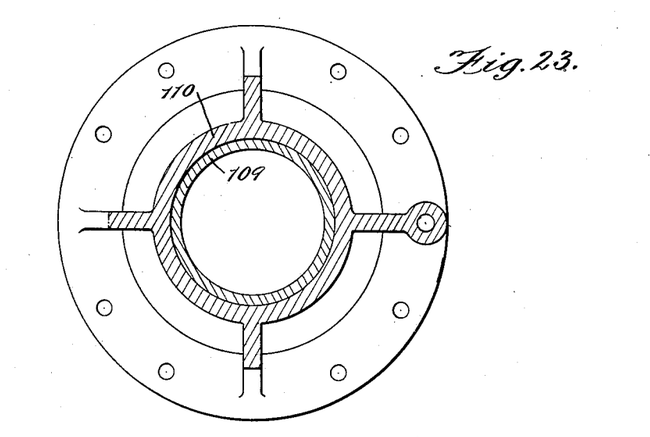
Fig. 23 is a cross-section on line 23—23 of Fig. 20, looking down.

In Figs. 16, and 20 to 23 we have shown a modified arrangement of the runners. In the construction shown in said figures, 100—101 indicate the upper and lower members of the pump cylinder section, the upper member being provided with inclined blades or vanes 102, which are substantially the same as the blades 49 shown in Fig. 5. Arranged centrally in the upper section 100 and forming a bearing for the pump-shaft is a sleeve 103 having a lining 104 of Babbitt metal, or other suitable material. The sleeve 103 corresponds with the sleeve 44 and is externally screw-threaded to receive the tube 38 or 39, as the case may be. 105 indicates the runner, which is in many respects similar to the runner 52, and being provided with blades 106 which direct the water outward and upward against the blades 102, thereby causing it to rise through the cylinder. The wheel 105 is adapted to be secured to the pump-shaft in the manner already described, but the construction shown in Figs. 16 to 23 differs from the construction shown in the earlier figures principally in that bearings are provided for the runner above and below the blades 106. As shown in Fig. 20, the runner 105 is provided with an upwardly-projecting annular flange 107 above the blades 106, which has a bearing in the lower end of a conical shell 108 which extends down from the sleeve 103, as shown in Fig. 20. In like manner, at its lower end the runner is provided with a downwardly-projecting flange 109 which has a bearing in an inwardly-projecting portion 110 of the lower member 101 of the pump cylinder, as also shown in Fig. 20. Both the flanges 107 and 109 are provided with grooves 111 forming water-packings, so as to permit the runner to move up and down freely without loss of water. The advantage of this construction is that when pumping hard the twist upon the pump-shaft has a tendency to shorten the shaft, but when the strain is off the shaft is again elongated to its normal length. This lengthening and shortening of the shaft necessarily raises and lowers the several runners which are connected with it, and consequently it is necessary to provide for such movement of the runner. Also there is more or less tendency for the runners to rise and fall in normal pumping.

That which we claim as our invention, and desire to secure by Letters Patent, is,—

1. In a pump, the combination of a well-tube, a cylinder communicating therewith, a rotary shaft extending longitudinally in said cylinder, means carried by said shaft for elevating the water in the cylinder, a piston at the lower end of said shaft, and a second cylinder in which said piston moves, said first-mentioned cylinder having a passage for admitting water from the pump to said second cylinder below said piston.

2. In a pump, the combination of a well-tube, a rotary shaft extending longitudinally therein, a plurality of pump cylinders communicating respectively with one another and with said well-tube, coöperating devices carried by said shaft and said cylinders for forcing the water upward into the well-tube, a piston at the lower end of said shaft, a cylinder in which said piston moves, and means for admitting water from the pump to the latter cylinder.

3. In a pump, the combination of a well-tube, a rotary shaft extending longitudinally therein, a plurality of pump cylinders communicating respectively with one another and with said well-tube, coöperating devices carried by said shaft and said cylinders for forcing the water upward into the well-tube, a piston at the lower end of said shaft, a cylinder in which said piston moves, means for admitting water from the pump to the latter cylinder, and means at the upper end portion of said shaft for suspending the same.

4. In a deep-well pump, the combination of a well-tube, a cylinder communicating therewith, a rotary shaft extending longitudinally in said cylinder, means at the upper end portion of said shaft for suspending the same, a piston at the lower end of said shaft, a second cylinder in which said piston moves, said first-mentioned cylinder having a passage for admitting water from the pump to said second cylinder, and an opening in the bottom of said second cylinder.

5. In a pump, the combination of a well-tube, a sectional cylinder communicating therewith, a rotary shaft extending longitudinally in said cylinder, a sleeve in said well-tube surrounding said shaft, means carried by said shaft for elevating the water in the cylinder, a bearing for the lower end of said shaft, and a duct formed integral with the cylinder sections and extending from above said water-elevating means to said bearing.

6. In a pump of the type described, the combination of a pump-shaft, one or more runners carried thereby, a bearing for the pump-shaft below the lowermost runner for centering the shaft, and means substantially inclosing said bearing for protecting the same.

7. In a vertical pump of the type described, the combination of a pump-shaft, one or more runners carried thereby, a bearing for the pump-shaft below the lowermost runner, and means inclosing and protecting said bearing, said protecting means having an opening at the bottom for the escape of sand.

8. In a vertical pump of the type described, the combination of a pump-shaft, one or more runners carried thereby, a bearing above the uppermost runner, a tube surrounding the pump-shaft above the uppermost runner, said tube having one or more perforations to admit water to said upper bearing, and means for straining the water passing through said perforation or perforations.

9. In a vertical pump of the type described, the combination of a well-tube forming a water-discharge passage, a pump-shaft in said well-tube, one or more runners carried thereby, a bearing for said shaft, a tube surrounding the pump-shaft adjacent to said bearing, said tube having one or more perforations to admit water to said bearing, and means for straining the water passing through said perforation or perforations.

10. In a vertical pump of the type described, the combination of a well-tube forming a water-discharge passage, a pump-shaft in said well-tube, one or more runners carried thereby, a bearing for said shaft, a tube surrounding the pump-shaft adjacent to said bearing, said tube having one or more perforations to admit water to said bearing, and means for straining the water passing through said perforation or perforations, said straining means being in said water-discharge passage.

11. In a vertical pump of the type described, the combination of a well-tube forming a water-discharge passage, a pump-shaft in said well-tube, one or more runners carried thereby, a bearing for said shaft, a tube surrounding the pump-shaft adjacent to said bearing, said tube having one or more perforations to admit water to said bearing, and means adjacent to the lower end of said tube for straining the water passing through said perforation or perforations.

12. The combination with the pump casing, the impeller therein, a shaft bearing carried by the pump casing, a line shaft passing through said bearing and carrying said impeller, a pump head, means forming a water conduit and for suspending said pump casing from said pump head, a head bearing member through which said line shaft projects, said head bearing member being mounted on said pump head, a driving pulley on said line shaft, a line shaft casing extending from the pump casing to the pump head and means for effecting a circulation of clear well water from the water conduit through said line shaft casing.

13. In a centrifugal pumping apparatus the following elements in combination, a centrifugal pump, a line shaft for the pump, a discharge duct from the pump to the top of the well through which said shaft passes, a shaft casing for closing said shaft off from the rising column of water in said discharge duct, and means for effecting a circulation of well water inside such shaft casing.

14. The combination of a well casing, a rotary pump therein, a pump shaft, a casing inclosing said shaft from the rising column of water in the well, means for freeing a portion of the rising column of well water from sand and detritus and passing the water so freed into said shaft casing.

15. In a well mechanism, in combination with a rotary pump, a pump shaft, a casing surrounding the shaft from the pump to the top of the well, to protect said shaft from the rising column of well water, and means for purifying a portion of said well water and delivering it into the shaft casing.

16. In a pumping apparatus having a water discharge passage, the combination of a shaft rotatable in said passage, a bearing for said shaft separated from said water discharge passage, and a screen covering a port between said shaft and said water discharge passage adapted to filter water permitted to pass to said bearing for lubricating purposes.

17. In a pumping apparatus, the combination of a water discharge casing, a shaft extending therethrough, a shaft casing located in said water discharge casing separating said shaft therefrom, means for rotating said shaft, means operatively connected with said shaft for forcing water upward through said water discharge casing, a bearing for said shaft in said shaft casing, and a screen covering a port in the wall of said shaft casing below the level of the water about said shaft casing during the pumping operation, said screen being adapted to filter water permitted to pass into said shaft casing for the purpose of lubricating said bearing.

18. The combination of a well casing, a pump shaft therein, a casing inclosing said shaft from the rising column of water in the well, means for rotating said shaft, and means actuated by the rotation of said shaft for forcing water upward through said well casing and for giving the water a swirling movement as it passes the lower end of said shaft casing whereby the sand or other sediment carried by the water is directed by centrifugal force away from said shaft casing at its lower end, said shaft casing having a port leading thereinto near its lower end for admitting water thereto.

19. The combination of a well casing, a pump shaft therein, a casing inclosing said shaft from the rising column of water in the well, means for rotating said shaft, means actuated by the rotation of said shaft for forcing water upward through said well casing and for giving the water a swirling movement as it passes the lower end of said shaft casing whereby the sand or other sediment carried by the water is directed by centrifugal force away from said shaft casing at its lower end, said shaft casing having a port leading thereinto near its lower end for admitting water thereto, and means for straining the water entering said shaft casing.

20. The combination of a well casing, a pump shaft therein, a casing inclosing said shaft from a rising column of water in the well, means for rotating said shaft, said shaft casing having a port leading thereinto for admitting water thereto, and means actuated by the rotation of said shaft for forcing water upward through said well casing and for giving the rising water a swirling movement as it passes said port whereby the sand or other sediment carried by the water is directed by centrifugal force away from said port.

21. In a pumping apparatus, the combination of a water discharge casing, a shaft extending therethrough, a shaft casing located in said water discharge casing separating said shaft therefrom, means for rotating said shaft, means operatively connected with said shaft for forcing water upward through said water discharge casing, and means for purifying a portion of the water pumped and delivering it into said shaft casing near its lower end adapted to discharge the water from the shaft casing upon the cessation of the operation of the pump.

MATTHEW T. CHAPMAN.
MARK C. CHAPMAN.

Witnesses:
HARRY WILLIAM SPILLER,
B. L. PALMER.

Copies of this patent may be obtained for five cents each, by addressing the "Commissioner of Patents, Washington, D. C."